2,914,516

PURIFICATION OF POLYVINYLPYRROLIDONE

Sidney Siggia, Phillipsburg, N.J., and Clarence Richard Stahl, Easton, Pa., assignors to General Aniline & Film Corporation, New York, N.Y., a corporation of Delaware No Drawing. Application May 7, 1956
Serial No. 582,919

1 Claim. (Cl. 260—88.3)

The invention here presented is a procedure for the purification of polyvinylpyrrolidone particularly for the removal therefrom of aldehydes.

In the use of polyvinylpyrrolidone it is desirable to have the aldehyde content as low as possible since these compounds lead to color, odor and other undesirable properties to the product. As commercially produced, the polymer may contain up to 0.5% aldehyde (calculated as acetaldehyde) whereas it is desirable that the amount of aldehyde in the polymer be as low as possible. By careful processing, it is usually possible to keep the amount of aldehyde below the maximum tolerated, but in spite of the utmost care, occasionally batches show amounts of aldehyde above the desired minimum.

According to the present invention the amount of aldehyde in a given batch of polymer is reduced by an appropriate chemical reaction. Particularly the aldehyde is subjected to reduction to an alcohol by hydrogenation with a Raney nickel catalyst or by oxidation to an acid using alkaline hydrogen peroxide. It is found that the presence of either the alcohol or the acid is entirely harmless and unobjectionable in the polymer as contrasted to the aldehyde per se. The aldehyde present in the polyvinylpyrrolidone is essentially all acetaldehyde. The resultant alcohol on reduction would be ethyl alcohol and the acid obtained on oxidation would be acetic acid. Most of the alcohol and acid are removed in the precipitation step of the process. Acetaldehyde as such cannot be removed by solution and reprecipitation of the polymer since the polyvinylpyrrolidone shows some complexing action for the aldehyde and the aldehyde remains in the polyvinlypyrrolidone.

The reactions are preferably conducted upon the polymer in water solution; the reduction reaction using a nickel catalyst and hydrogen is preferably conducted in an autoclave, at room temperature and pressures up to 800 to 1500 pounds per square inch. When the reduction is complete, the pressure is released and the water solution may then be filtered to remove the nickel catalyst leaving a clear water solution of the polymer. This may be used as such, or it may be dried in any convenient way as by spray drying or drum drying. The alcohol produced, which is substantially all ethyl alcohol from acetaldehyde is highly volatile, and is substantially completely removed by such an evaporation procedure. In addition, the presence of traces of ethyl alcohol are harmless for any known use of the polymer. The oxidation reaction by alkaline peroxide likewise is desirably conducted at room temperature, but no pressure is required. When the reaction is complete the water solution may be evaporated as before, and in this instance also the acetic acid which is substantially the only acid produced, is completely volatilized with the water, from the polymer. As before, the purified polymer may be used in the water solution in which the reaction is conducted, since traces of peroxide and ammonia are harmless for practically all uses. It may be noted that ammonium acetate is of relatively low volatility, but the quantity present is so small that it tends strongly to be carried over with the evaporated water.

Surprisingly enough, it is also found that the polymer may be precipitated from water solution by acetone and as so precipitated it does not carry down with it any measurable amount of acetone and accordingly the polymer may also be recovered by precipitation with acetone and the acetone-water mixture filtered off from the solid precipitated polymer.

The following examples show the preferred methods of practicing the present invention and are offered as illustrations only and not as limitations upon the claims.

Example 1

A solution of 150 gm. polyvinylpyrrolidone in 500 ml. of water solution was prepared. The pH was adjusted to 7.5 and the solution was hydrogenated at 4700–5000 pounds per square inch for 8 hours at 50° C. using 10 gm. of Raney nickel as catalyst. The Raney nickel was filtered off, and the polyvinylpyrrolidone was removed from the solution by spray drying of the water solution. For this purpose the polymer solution is warmed to a convenient temperature and sprayed under pressure into a current of warm air which evaporates the water and carries it away, leaving behind the polymer in fine powder form which is very desirable for packaging, shipping and dispensing.

Example 2

A solution of 150 gm. polyvinylpyrrolidone in 500 ml. of water solution was prepared. The pH was adjusted to 7.5 and the solution was hydrogenated at 4700–5000 pounds per square inch for 8 hours at 50° C. using 10 gm. of Raney nickel as catalyst. The Raney nickel was filtered off, and the polyvinylpyrrolidone was removed from the solution by precipitation with acetone. The polyvinylpyrrolidone was redissolved in water and then precipitated with acetone. The polyvinylpyrrolidone obtained was analyzed by the method of Siggia and Maxcy, Ind. Eng. Chem., Anal. Chem., 19, 1023 (1947), and found to contain less than 0.02% aldehyde calculated as $CH_3$—CHO.

Example 3

30 gm. of polyvinylpyrrolidone was dissolved in 100 ml. of water and treated at 60° C. for 1 hour with 50 ml. of 1 N NaOH and 5 ml. of 30% $H_2O_2$. The solution was cooled and acidified with acetic acid and heated for 18 hours at 50° C. This solution was then spray dried as in Example 1 to yield an excellent grade of finely powdered polymer which contained harmless traces of sodium acetate.

Example 4

30 gm of polyvinylpyrrolidone was dissolved in 100 ml. of water and treated at 60° C. for 1 hour with 50 ml. of 1 N NaOH and 5 ml. of 30% $H_2O_2$. The solution was cooled and acidified with acetic acid and heated for 18 hours at 50° C. The polyvinylpyrrolidone was then precipitated with acetone. The precipitate was then redissolved in water and spray dried as in Example 1. The current warm air removed the water and with it all traces of acetone, leaving a highly purified grade of polymer in a finely powdered condition which is highly desirable for packaging and dispensing.

Example 5

30 gm. of polyvinylpyrrolidone was dissolved in 100 ml. of water and treated at 60° C. for 1 hour with 50 ml. of 1 N NaOH and 5 ml. of 30% $H_2O_2$. The solution was cooled and acidified with acetic acid and heated for 18 hours at 50° C. The polyvinylpyrrolidone was then precipitated with acetone. The precipitate was redissolved in water and the polyvinylpyrrolidone reprecipitated with acetone. The precipitated polyvinylpyrrolidone was dried in a vacuum oven at 50° C. The product was found to contain less than 0.01% aldehyde calculated as CHO as determined by the method of Siggia and Maxcy (see Example 2 for reference).

*Example 6*

A solution of 150 gm. polyvinylpyrrolidone in 500 ml. of water solution was prepared. The pH was adjusted to 7.5 and the solution was hydrogenated at 4700–5000 pounds per square inch for 8 hours at 50° C. using 10 gm. of Raney nickel as catalyst. The Raney nickel was filtered off, and the polyvinylpyrrolidone was removed from the solution by precipitation with acetone. The resulting clear solution of polymer in water was then drum dried by covering the drum surface with the solution and using steam inside the drum to raise the temperature of the solution to the point where the water evaporated off during one revolution of the drum. The solid polymer was then scraped off the drum by a "doctor knife." The resulting polymer then occurs in flakes of a highly satisfactory size and character for dense packaging, the density of the material in the package being significantly higher than the density of the powdered material after spray drying. It may be noted that the reagents used above are all either volatile at low temperature or water-insoluble substances which can be filtered out and these are the preferred forms since no residual products are left in the polymer. Alternatively however other standard reducing agents such as hydrazine sulfate, the sulfhydrates and the like will reduce the acetone satisfactorily. However they leave residual impurities which are much more difficult to remove from the polymer, although the step of precipitating by acetone after reduction reaction, then redissolving and spray drying will remove the impurities, if they are water soluble and not occluded or adsorbed by the precipitated polymer.

Thus the procedure of the invention removes from polyvinylpyrrolidone substantially all process of aldehydes by the simple procedure of converting them to higher or lower oxidation products by the application of agents which leave no harmful residues.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

Process for the removal of acetaldehyde from polyvinylpyrrolidone containing the same, which comprises dissolving acetaldehyde-containing polyvinylpyrrolidone in water, adjusting the pH of the aqueous solution formed to 7.5, applying to the said aqueous solution, in the presence of a Raney nickel catalyst, hydrogen under a pressure of 4700 to 5000 pounds per square inch for 8 hours of 50° C., the amount of hydrogen supplied being sufficient to cause substantially the whole of acetaldehyde to be converted to ethyl alcohol, filtering out the Raney nickel catalyst, and removing the polyvinylpyrrolidone from the solution by spray drying the latter, the polyvinylpyrrolidone being obtained in the form of a powder and the water and ethyl alcohol being evaporated off.

References Cited in the file of this patent
UNITED STATES PATENTS

| | | |
|---|---|---|
| 2,205,184 | Woodhouse | June 18, 1940 |
| 2,665,271 | Beller | Jan. 5, 1949 |